United States Patent
Ding et al.

(10) Patent No.: US 12,531,423 B2
(45) Date of Patent: Jan. 20, 2026

(54) METHOD FOR AUTOMATIC ADJUSTMENT OF POWER GRID OPERATION MODE BASE ON REINFORCEMENT LEARNING

(71) Applicant: XI'AN JIAOTONG UNIVERSITY, Xi'an (CN)

(72) Inventors: Tao Ding, Xi'an (CN); Mingle Li, Xi'an (CN); Shuai Li, Xi'an (CN); Zhiqin Tian, Xi'an (CN); Yixing Gao, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 379 days.

(21) Appl. No.: 18/306,018

(22) Filed: Apr. 24, 2023

(65) Prior Publication Data
US 2023/0344242 A1 Oct. 26, 2023

(30) Foreign Application Priority Data
Apr. 24, 2022 (CN) .......................... 202210456909.2

(51) Int. Cl.
*H02J 3/46* (2006.01)
*G05B 19/042* (2006.01)
*H02J 3/06* (2006.01)

(52) U.S. Cl.
CPC ............ *H02J 3/472* (2020.01); *G05B 19/042* (2013.01); *H02J 3/06* (2013.01); *G05B 2219/2639* (2013.01); *H02J 2203/20* (2020.01)

(58) Field of Classification Search
CPC .......... H02J 3/472; H02J 3/06; H02J 2203/20; H02J 3/48; G05B 19/042; G05B 2219/2639; Y04S 10/50
See application file for complete search history.

(56) References Cited

FOREIGN PATENT DOCUMENTS

CN 114048903 A * 2/2022 ............. G06Q 50/06

OTHER PUBLICATIONS

English Translation of "CN-114048903-A" (Year: 2022).*

* cited by examiner

*Primary Examiner* — Charles R Kasenge

(57) ABSTRACT

A method for automatic adjustment of a power grid operation mode based on reinforcement learning is provided. An expert system for automatic adjustment is designed, which relies on the control sequence of thermal power units, enabling automatic decision-making for power grid operation mode adjustment. A sensitivity matrix is extracted from the historical operating data of the power grid, from which a foundational thermal power unit control sequence is derived. An overload control strategy for lines within the expert system is devised. A reinforcement learning model optimizes the thermal power unit control sequence, which refines the foundational thermal power unit control sequence and provides the expert system with the optimized control sequence for automatic decision-making in power grid operation mode adjustment. This method offers a solution to balancing and absorption challenges brought about by fluctuations on both the supply and demand sides in high-proportion renewable energy power systems.

10 Claims, 4 Drawing Sheets

METHOD FOR AUTOMATIC ADJUSTMENT OF POWER GRID OPERATION MODE BASE ON REINFORCEMENT LEARNING

CROSS REFERENCE TO RELATED APPLICATION

The present application claims priority to Chinese Patent Application No. 202210456909.2 filed on Apr. 24, 2022 and entitled "METHOD FOR AUTOMATIC ADJUSTMENT OF POWER GRID OPERATION MODE BASE ON REINFORCEMENT LEARNING", which is incorporated herein by reference in its entirety.

TECHNICAL FIELD

The present disclosure relates to the field of power system dispatching and specifically to a method for automatic adjustment of a power grid operation mode based on reinforcement learning.

BACKGROUND

There is a prominent problem in an operation of the new power system with the new energy resource as a principle part. In the situation of massive renewable energy, the single or limited-objective power grid optimization has evolved to a complex, multi-layer, and multi-zone optimization. Adjusting the operation mode of the power grid is the most significant and repetitive task in mode calculation. Traditional manual adjustment methods are not only time-consuming and labor-intensive but also struggle to reflect and address the balance and absorption issues caused by the uncertainties on both the generation and load sides in actual operating scenarios due to the relatively fixed output and load settings of renewable energy.

With the development of artificial intelligence technology, reinforcement learning has gradually been applied to the automatic adjustment of power grid operation modes. Reinforcement learning explores the state and action spaces, uses the information obtained during exploration to update the action utility function, and thus forms experience-guided automatic adjustments of the power grid operation mode. However, the size of the state and action spaces in reinforcement learning models grows exponentially with the increase of the number of system nodes, leading to a dramatic increase in exploration costs. Furthermore, power systems, especially complex ones, have high requirements for operation modes. Nevertheless, during the training process of reinforcement learning models, randomly generated new power grid operation modes often fail to meet the convergence requirements of power flow calculations, resulting in ineffective operation modes and extremely low exploration efficiency. Therefore, directly using traditional reinforcement learning models on the automatic adjustment of power grid operation modes still presents significant challenges.

SUMMARY

In light of this, the main objective of this disclosure is to provide a method for automatic adjustment of a power grid operation mode based on a specially designed expert system, which aims to address the existing problems of reinforcement learning models on power grid operation mode adjustments. This new technical solution is provided to tackle the balance and absorption issues brought by the uncertainties on both the generation and load sides in high-proportion renewable energy power systems and to achieve automatic adjustment of power grid operation modes.

To achieve the aforementioned objective, the present disclosure provides a method for automatic adjustment of a power grid operation mode based on reinforcement learning, which comprises the following steps:

determining a total active power adjustment amount of thermal power units for a next time;

if an action space of each thermal power unit is within a power output adjustment range, allocating the total active power adjustment amount to the thermal power units according to an optimal control sequence;

if the action space of each thermal power unit is below a lower limit or above an upper limit of the action space of the thermal power unit, allocating the total active power adjustment amount to the thermal power units according to the optimal control sequence after a startup-shutdown operation; and after the allocation is completed, redistributing a power flow adjustment amount based on a line overload or critical line overload, and adjusting a unit terminal voltage.

The optimal control sequence of the thermal power units is obtained through a reinforcement learning model.

In the aforementioned technical solution, the method can achieve automatic adjustment of power grid operation modes, thereby effectively addressing the balance and absorption issues brought by the uncertainties on both the generation and load sides in high-proportion renewable energy power systems. This ensures the safe and stable operation of the power grid and maximizes the absorption of renewable energy. By utilizing the reinforcement learning model, the exploration efficiency of the optimal unit control sequence can be improved.

As a further improvement to the technical solution, in the method, after the allocation of the system, the load of each line is checked for overload or critical overload. For the main units involved in overloaded or critically overloaded lines, the power flow adjustment amount is redistributed to enhance the safety of power grid operation. The redistribution of the power flow adjustment amount includes the following steps:

identifying a key unit of a line load rate;

if the key unit is a renewable energy unit, reducing a power output of the renewable energy unit to a first set value when the line load rate is greater than a first set threshold; reducing the power output of the renewable energy unit to a second set value when the line load rate is greater than 1 and less than or equal to the first set threshold, and the renewable energy unit is still overloaded as the number of continuous reductions reaches a set number; and if the key unit is a thermal power unit, reducing a power output of the thermal power unit to a lower limit of the power output of the thermal power unit.

As a further improvement to the aforementioned technical solution, in the method, the key unit is determined through an active power-line load rate sensitivity matrix, which allows for a rapid and accurate identification of overloaded lines or a foundational unit control sequence, which includes:

extracting row vectors of the active power-line load rate sensitivity matrix;

filtering components corresponding to nodes where units are located; and determining a unit mounted on a node corresponding to a component with a largest absolute value as the key unit.

The active power-line load rate sensitivity matrix is an m×n matrix, where m is the number of branches in a power system and n is the number of nodes in the power system.

As a further improvement to the aforementioned technical solution, in the method, the optimal unit control sequence is obtained by inputting the foundational unit control sequence into the reinforcement learning model; the foundational unit control sequence is obtained by summing and sorting column vectors of the active power-line load rate sensitivity matrix; the active power-line load rate sensitivity matrix is an m×n matrix, with m being the number of branches in the power system and n being the number of nodes in the power system. The reinforcement learning model explores the unit control sequence with the highest probability of obtaining the maximum reward during the training process.

As a further improvement to the aforementioned technical solution, in the method, the active power-line load rate sensitivity matrix is extracted based on historical operation data when all units are fully operational and no disconnected lines exist in the grid, thereby making the identification of the key unit and the judgment of overloads closer to the actual power grid, facilitating safe, effective, and stable automatic adjustment of the power grid.

As a further improvement to the aforementioned technical solution, in the method, the reinforcement learning model takes the unit control sequence as an agent's state, uses two positions in the unit control sequence as an agent's action, and employs a comprehensive evaluation index as a reward; factors influencing the comprehensive evaluation index include relative absorption of renewable energy, line overload conditions, unit power output constraints, node voltage constraints, and operational economic costs, thereby ensuring that the obtained optimal unit control sequence can maximize the absorption of renewable energy under the premise of ensuring the safe operation of the power grid, improving the utilization of renewable energy, and reducing the operation cost of the power grid. Moreover, the model only needs to learn a 2-dimensional discrete action vector composed of two scalar coordinates, which makes convergence relatively simple.

As a further improvement to the aforementioned technical solution, in the method, by providing reward feedback for the effectiveness of the power grid operation mode output in each exploration, the exploration efficiency is improved, and the exponential growth of exploration costs is turned into linear growth; the reward is calculated by the following formula:

$$R = \sum_{i=1}^{5} r_i,$$

where, R is the reward; $r_i$ is a partial reward value;
When i=1, $$r_1 = \frac{\sum_{j=1}^{Re} renewable_{t+1,j}}{\sum_{j=1}^{Re} renewable_{t+1,j}^{max}},$$

where, $renewable_{t+1,j}$ is a power output of a j-th renewable energy unit at time t+1; $renewable_{t+1,j}^{max}$, is an upper limit of the power output of the j-th renewable energy unit at time t+1; Re is the number of renewable energy units; and
When i≠1, $$r_i = \begin{cases} -0.5, & A_{max}^i < A^i \\ 0, & A_{min}^i \leq A^i \leq A_{max}^i, \\ -0.5, & A^i < A_{min}^i \end{cases}$$

where A represents constraint; when i=2, the constraint is a line current; when i=3, the constraint is a unit power output; when i=4, the constraint is a node voltage; when i=5, the constraint is operational economic cost; subscripts, such as max and min, represent an upper limit of a corresponding constraint and a lower limit of the corresponding constraint, respectively.

As a further improvement to the aforementioned technical solution, in the method, the total active power adjustment amount of the thermal power units at the next time is determined by the following formula:

$$\Delta thermal = thermal_{t+1} - thermal_t,$$

where $thermal_t$ is a thermal power output at a current time t, $thermal_{t+1}$ is a thermal power output at the next time.
$thermal_{t+1}$ is calculated by the following equation:

$$thermal_{t+1} = \sum_{l=1}^{L} load_{t+1,l} + loss_{t+1} - balance_{t+1} - \sum_{j=1}^{Re} renewable_{t+1,j},$$

where L is a total number of loads, l is a load number variable, Re is the number of the renewable energy units, j is a renewable energy unit number variable;

$$\sum_{l=1}^{L} load_{t+1,l}$$

is a total load at time t+1;
$renewable_{t+1,j}$ is a power output of the j-th renewable energy unit at time t+1;
$balance_{t+1}$ is a balance unit power output at time t+1;
$loss_{t+1}$ is network loss power at the next time, calculated by the following equation:

$$loss_{t+1} = loss_t \cdot Lfactor,$$

where Lfactor is a network loss estimation coefficient, calculated by the following equation:

$$Lfactor = \frac{\sum_{l=1}^{L} load_{t+1,l}}{\sum_{l=1}^{L} load_{t,l}}.$$

As a further improvement to the aforementioned technical solution, in the method, when the action space of the ith thermal power unit crosses the lower or upper limit of the action space of thermal power units, a startup-shutdown operation is carried out according to the total active power adjustment amount, considering the unit control sequence, unit capacity, and network parameters, to maintain network losses at a low level. The startup-shutdown operation includes:

When load fluctuations cause the required thermal power adjustment amount to exceed an upper limit of ramping constraints of the thermal power units, the thermal power units are started in an ascending sequence of line load rate sensitivity; power provided by the started thermal power units can compensate for a part of the required thermal power adjustment amount that exceeds the upper limit of the ramping constraints;

When the load fluctuations cause the required thermal power adjustment amount to be below a lower limit of the ramping constraints of the thermal power units, the thermal power units are shut down in a descending sequence of line load rate sensitivity; power reduction from the shutdown thermal power units can offset the required thermal power adjustment amount being below the lower limit of the ramping constraints;

When a ratio of actual processing to maximum processing for all operating units exceeds a second set threshold, the thermal power units are started in an ascending sequence of line load rate sensitivity to make the ratio less than the second set threshold;

When a ratio of actual processing to maximum processing for all operating units is below a third set threshold, the thermal power units are shut down in a descending sequence of line load rate sensitivity to make the ratio greater than the third set threshold.

As a further improvement to the aforementioned technical solution, in the method, after completing the adjustment of the power output of thermal power units, the unit terminal voltage is adjusted to control the reactive power within the range of [−180, 100], thereby ensuring the normal operation of the power grid and minimizing network losses. The unit terminal voltage adjustment includes:

a voltage of a generator unit is denoted as $U_k$, and a reactive power of the power unit is denoted as $Q_k$, where k represents a generator unit identifier; when $Q_k \geq 100$, $U_k = U_k - 0.01$; when $60 \leq Q_k < 100$, $U_k = U_k - 0.004$; when $-90 < Q_k < 60$, $U_k = U_k$; when $-180 < Q_k \leq -90$, $U_k = U_k + 0.0015$; and when $Q_k \leq 180$, $U_k = U_k + 0.01$.

BRIEF DESCRIPTION OF THE DRAWINGS

To further illustrate the technical solutions in the embodiments of the present disclosure, a brief introduction to the figures used in the description of the embodiments will be given below. It should be noted that the figures described below are only some embodiments of the present disclosure, and for those skilled in the art, other figures can be obtained based on these figures without creative effort.

DETAILED DESCRIPTION OF THE EMBODIMENTS

The technical solutions in the embodiments of the present disclosure will be described in a clear and complete manner, in conjunction with the figures of the embodiments of the present disclosure. Obviously, the described embodiments are only a part of the embodiments of the present disclosure, and not all of them. All other embodiments obtained by those skilled in the art without creative effort based on the embodiments of the present disclosure fall in the scope of protection of the present disclosure.

The terms "first", "second", "third" are used for descriptive purposes only and cannot be understood as indicating or implying relative importance or implicitly indicating the number of technical features indicated. Therefore, features defined as "first", "second", "third" may expressly or implicitly include one or more of such features.

Figure 1:
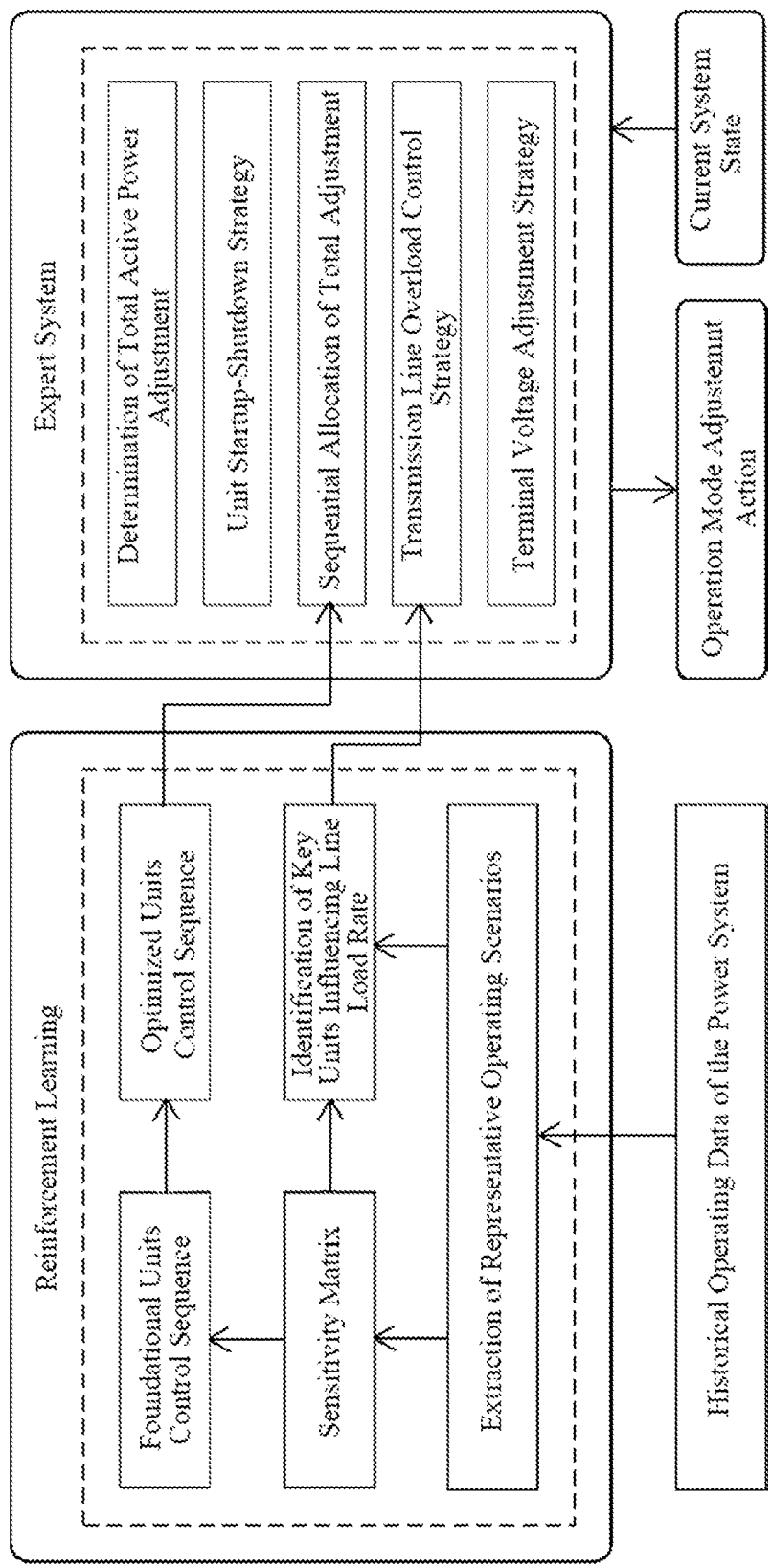
FIG. 1 is a schematic diagram illustrating a combination application of an expert system and reinforcement learning in one embodiment.

In embodiment 1, a method based on the present disclosure implements an expert system and a reinforcement learning model, both of which are combined to achieve automatic adjustment of a power grid operation mode as shown in FIG. 1. The expert system ensures the validity of an exploration outputting a power grid operation mode, thereby greatly improving exploration efficiency, and transforming the exponential growth into the linear growth on exploration cost of the reinforcement learning model. The expert system is guided, by the unit control sequence with the highest probability of obtaining maximum rewards explored during the reinforcement learning training process, to enable automatic adjustment of the power grid, thereby maximizing renewable energy absorption while ensuring safe and stable operation of the power grid.

In the expert system, the following steps are implemented, which includes:

(1.1) Identifying a total load at the next time $$\sum_{l=1}^{L} load_{t+1,l},$$

where L is the total number of loads and l is a load number variable;

(1.2) Identifying a sum of upper limits of power outputs of renewable energy units at the next time $$\sum_{j=1}^{Re} renewable_{t+1,j},$$

where Re is the number of renewable energy units and j is a renewable energy unit number variable;

(1.3) Setting power output of each renewable energy unit at the next time to its maximum value, then $$\sum_{j=1}^{Re} renewable_{t+1,j} = \sum_{j=1}^{Re} renewable_{t+1,j}^{max};$$

(1.4) Calculating a network loss estimation coefficient Lfactor:

$$Lfactor = \frac{\sum_{l=1}^{L} load_{t+1,l}}{\sum_{l=1}^{L} load_{t,l}},$$

where L is the total number of loads, and l is the load number variable;

(1.5) Based on a loss at the previous time $loss_t$, and the network loss estimation coefficient Lfactor, calculating the network loss power at the next time $loss_{t+1}$:

$loss_{t+1} = loss_t \cdot Lfactor;$ (1.6) Setting the power output of a balancing unit at the next time, $balance_{t+1}$, to the arithmetic mean of its upper and lower limits, thereby leaving sufficient margin;

(1.7) Calculating the expected total thermal power output at the next time, $thermal_{t+1}$:

$$thermal_{t+1} = \sum_{l=1}^{L} load_{t+1,l} + loss_{t+1} - balance_{t+1} - \sum_{j=1}^{Re} renewable_{t+1,j};$$

and (1.8) Determining the total active power adjustment amount of the thermal power units at the next time by the following formula:

$\Delta thermal = thermal_{t+1} - thermal_t,$ where, $thermal_t$ is the thermal power output at the current time t, and $thermal_t+1$ is the thermal power output at the next time.

For the number of thermal power units T, the k-th thermal power unit $G_k$, and its action space $\Delta G_k$, there are a lower limit $low_k$, $low_k<0$, and an upper limit $high_k$, that is:

$low_k < \Delta G_k < high_k.$

For all thermal power units, an action space of each thermal power unit is obtained. If each thermal power unit is in a reasonable power output adjustment range, according to the unit control sequence, the total active power adjustment amount is allocated to all thermal power units. Otherwise, if an action space of each thermal power unit is lower than the lower limit of the action space of the thermal power unit or higher than the upper limit of the action space of the thermal power unit, the total active power adjustment amount is allocated to all thermal power units according to the unit control sequence, after the startup-shutdown operation.

When the total active power adjustment amount is allocated to all thermal power units, if $\Delta thermal>0$, the power output of the thermal power unit $G_k$ is set to the lower limit $low_k$, that is:

$$\Delta thermal^* = \Delta thermal + \sum_{k=1}^{T} low_k.$$

The obtained $\Delta thermal^*$ is distributed in sequence according to the optimal unit control sequence. When $\Delta thermal<0$, the power output of the thermal power unit $G_k$ is set to the upper limit $high_k$, that is:

$$\Delta thermal^* = \Delta thermal + \sum_{k=1}^{T} high_k.$$

The obtained $\Delta thermal^*$ is distributed in a reverse sequence according to the optimal unit control sequence.

After completing the allocation, the load flow is adjusted based on line overloads or critical overloads, and the load flow adjustment amount is redistributed. That is, after the power output of the thermal power units is adjusted, the reactive power $Q_k$ may be controlled within a range of [−180, 100] by adjusting a voltage $u_k$ of the generator unit, thereby ensuring normal operation of the power grid and minimizing network losses. The voltage of the generator unit is represented as $u_k$ and the reactive power is represented as $Q_k$, where k represents the generator unit identification. The terminal voltage adjustment includes: when $Q_k \geq 100$, $U_k = U_k - 0.01$; when $60 \leq Q_k < 100$, $U_k = U_k - 0.004$; when $-90 < Q_k < 60$, $U_k = U_k$; when $-180 < Q_k \leq -90$, $U_k = U_k + 0.0015$; when $Q_k \leq 180$, $U_k = U_k + 0.01$.

In embodiment 1, an alarm threshold of the line load rate is set, and when the line current load rate exceeds the alarm threshold, it is identified as an overloaded line. When overloaded lines appear in the system, the overloaded lines are required to be identified to find a key unit $G_{key}$ affecting line overload based on the overloaded lines.

The algebraic sum of the power and load of the generator at each node is defined as the node net injection power. Since the load rate ρ has an approximate linear relationship with the net injection active power P and net injection reactive power Q at the node, the following relationship exists:

$\Delta \rho = H_P \cdot \Delta P + H_Q \cdot \Delta Q$ \hfill (1)

where $H_p$ is a node injection active power-line load rate sensitivity matrix, $H_Q$ is a node injection reactive power-line load rate sensitivity matrix, $\Delta \rho$ is a line load rate change matrix, $\Delta P$ is a node injection active power adjustment matrix, and $\Delta Q$ is a node injection reactive power adjustment matrix.

Since the impact of $\Delta Q$ on the load rate is relatively small, it is ignored, and formula (1) becomes:

$\Delta \rho \approx H_P \cdot \Delta P$ \hfill (2).

A large amount of historical operation data from numerical simulation or actual operation and maintenance is obtained to extract sampling data intypical operation scenarios where all units are fully powered and there are no disconnected lines in the network: node injection active power adjustment matrix $\Delta P$ and line load rate change matrix $\Delta \rho$, where $\Delta \rho = [\Delta \rho_1, \Delta \rho_2, \ldots, \Delta \rho_x] \Delta P = [\Delta P_1, \Delta P_2, \ldots, \Delta P_x]$, and x is the number of samples.

The active power-line load rate sensitivity matrix $H_p$ in formula (2) is solved using the least squares method:

$H_p = \Delta \rho (\Delta P^T \Delta P^1)^{-1} \Delta P^T,$ where, $H_p$ is an m×n matrix, m is the number of system branches, and n is the number of system nodes. A row vector where the overloaded line is in $H_p$ is extracted, a component corresponding to the node where the unit is located is filtered, and a unit at a node with the largest absolute value of the component corresponds to the key unit affecting the overloaded line.

If the key unit is a thermal power unit, the power output of the thermal power unit is reduced to its lower limit. If the key unit is a renewable energy unit, when the load rate is greater than the first set threshold, the power output of the renewable energy unit is reduced to the first set value; when the load rate is greater than 1 and less than or equal to the first set threshold, if the number of continuous reductions reaches the set number and the renewable energy unit is still overloaded, the power output of the renewable energy unit is reduced to the second set value. The first set threshold can be 1.1, 1.2, 1.3, etc., the first set value can be 9%, 10%, 11%, 12%, etc., the second set value can be 25%, 30%, 35%, etc., and the number of iterations can be 2, 3, 4, 5, etc., thereby ensuring the safe and stable operation of the power grid and maximizing the absorption of renewable energy.

The startup-shutdown operation can ensure that network losses are maintained at a relatively low level. Based on network topology, line capacity, and line admittance network parameter information, the startup sequence is designated, i.e., thermal power units closer to the load in the network are first started up, and in a reverse sequence, thermal power units farther from the load in the network are first shut down.

The startup-shutdown operation will be carried out when the following two situations occur:

Situation 1: in a case that load fluctuations are large, and renewable energy has reached its maximum absorption and the required thermal power adjustment amount exceeds the ramp constraint range of the thermal power units, the startup-shutdown operation of thermal power units should be considered to ensure power balance.

Situation 2: When the ratio of the sum of actual power outputs of all operating thermal power units to the sum of upper limits of the power output is higher than the second set threshold or lower than the third set threshold, the startup-shutdown operation should be considered. In the process of summing up the actual power output of all operating thermal power units, the actual power output and upper limit of the power output contributed by the unit in shutdown state are both 0. The second and third set thresholds can be adjusted according to the actual operation of the power system.

For Situation 1:

(I) When load fluctuations cause the required thermal power adjustment amount to exceed the upper limit of the ramp constraint of thermal power units, that is, $$\Delta thermal > \sum_{k=1}^{T} high_k,$$

the thermal power units should be started. The startup operations are sorted in an ascending sequence of the sensitivity of the line load rate. The smaller the impact on the line load rate, the higher the startup priority. The power provided by the started thermal power units, $\Delta thermal_{open}$, compensates for the part of the required thermal power adjustment amount that exceeds the upper limit of the ramp constraint, and the startup can be terminated, i.e., $$\Delta thermal_{open} + \Delta thermal \leq \sum_{k=1}^{T} high_k.$$

(II) When load fluctuations cause the required thermal power adjustment amount to be lower than the lower limit of the ramp constraint of thermal power units, that is, $$\Delta thermal + \Delta thermal_{close} \geq \sum_{k=1}^{T} low_k.$$

the thermal power units should be shut down. The shutdown operations are performed in the reverse sequence of the startup sequence, that is, the shutdown operations are sorted in a descending sequence of the sensitivity of the line load rate. The greater the impact on the line load rate, the higher the shutdown priority. Similarly, the number of shutdowns depends on the reduced power $\Delta thermal_{close}$ of the shutdown thermal power units, which can offset the required thermal power adjustment amount lower than the lower limit of the ramp constraint of the thermal power units, i.e., ensuring:

$$\Delta thermal + \Delta thermal_{close} \geq \sum_{k=1}^{T} low_k.$$

For Situation 2:

(III) When the ratio of the actual processing to the maximum processing of all operating generators exceeds the second set threshold, the operating generators are under heavy load, and some load needs to be shared by starting generators. The startup operation is carried out according to the startup sequence until the ratio of the actual processing to the maximum processing of all operating generators is less than the second set threshold.

(IV) When the ratio of the actual processing to the maximum processing of all operating generators is lower than the third set threshold, it indicates that the load is not large, and the operating generators are under low load, and thus the shutdown operation needs to be carried out. Shutdown is carried out according to the shutdown sequence, which is the reverse sequence of the startup sequence, until the ratio of the actual processing to the maximum processing of all operating generators is higher than the third set threshold.

In embodiment 1, the optimal unit control sequence is obtained through a reinforcement learning model. In the reinforcement learning model, the unit control sequence is used as the state S of agent, and the two position coordinates in the sequence are used as the action A of agent. In each time step, the old state of the agent is changed to the new state by swapping the positions of the units at these two coordinates.

The influencing factors of the comprehensive evaluation index include the relative absorption of renewable energy, line over-limit conditions, unit power output constraints, node voltage constraints, and operational economic costs, so that the optimal unit control sequence obtained can maximize the absorption of renewable energy and improve the utilization rate of renewable energy in the premise of ensuring the safe operation of the power grid, thereby reducing the operating cost of the power grid. Therefore, a feasible reward implementation can be:

$$R = \sum_{i=1}^{5} r_i,$$

where R is the reward; $r_i$ is the partial reward value; When i=1, $$r_1 = \frac{\sum_{j=1}^{Re} renewable_{t+1,j}}{\sum_{j=1}^{Re} renewable_{t+1,j}^{max}},$$

where renewable$_{t+1}$, t is the power output of the j-th renewable energy unit at time t+1; renewable$_{t+1,j}^{max}$ is the upper limit of the power output of the j-th renewable energy unit at time t+1; Re is the number of renewable energy units;

When i≠1, $$r_i = \begin{cases} -0.5, & A^i_{max} < A^i \\ 0, & A^i_{min} \le A^i \le A^i_{max} \\ -0.5, & A^i < A^i_{min} \end{cases}$$

where A represents a constraint; when i=2, the constraint is a line current; when i=3, the constraint is unit power output; when i=4, the constraint is a node voltage; when i=5, the constraint is operational economic cost; the subscripts, i.e., max and min, represent the upper and lower limits of the corresponding constraints, respectively.

During the training process of the model, the agent swaps the positions of the units at two random indices in the unit control sequence and outputs a new control sequence. The foundational unit control sequence is input into the agent of the reinforcement learning model, the agent then outputs the optimal unit control sequence. The method of embodiment 1 adjusts the operation of the power grid according to the optimal unit control sequence. Based on the adjusted system power flow, the reward obtained by the agent is calculated.

Specifically, the result of the reinforcement learning model learning is the action utility function Q:(S,A)→R If the current combination (S,A) has not been explored, i.e., there is no relevant information in Q, two positions are randomly generated to form a random action A for exploration; if the current combination (S,A) has been explored, Q is updated using the following formula:

$$Q(S,A) \leftarrow (1-\alpha)Q(S,A) + \alpha[R(S,a) + \gamma \max_a Q(S',a)]$$

where α is the learning rate, and γ is the discount factor.

When the training is complete, the action utility function Q:(S,A)→R is rolled up into the state evaluation function V:S→R, and the unit control sequence corresponding to the highest score is selected. This sequence is the final optimized unit control sequence.

In the reinforcement learning model, the foundational unit control sequence is obtained through the following steps:

The column vectors of the active power-line load rate sensitivity matrix H$_p$ are summed and sorted in descending sequence. The relative sequence of respective generator units in this sorting constitutes the foundational unit control sequence.

In Embodiment 2, the alarm threshold is set to be less than 1, which allows for the early identification of overloaded and critically overloaded lines so as to take action of protection in advance, thus improving the robustness of the control strategy. This sequence is written into the expert system, thereby completing the closed loop.

In Embodiment 3, after the method of the disclosure is implemented using Python, the following scenario is set: the IEEE standard case 118 system framework is used. This system includes 118 nodes, 54 generator units, 186 transmission lines, and 91 loads, and in the system, 18 units are set as renewable energy units. Based on the power output characteristics of renewable energy and load fluctuations, 8760 hours of renewable energy power output and load data are randomly simulated. Each time step is 5 minutes long. At each round, a random section is selected as the starting section, and the total reward accumulated over 288 consecutive time steps is used to evaluate the power flow automatic adjustment scheme. If the power flow fails to converge, the round ends prematurely. The Deep Deterministic Policy Gradient (DDPG) model is used as the reinforcement learning model.

(I) Comparison of Reinforcement Learning Models with and without Expert Systems

Figure 2:
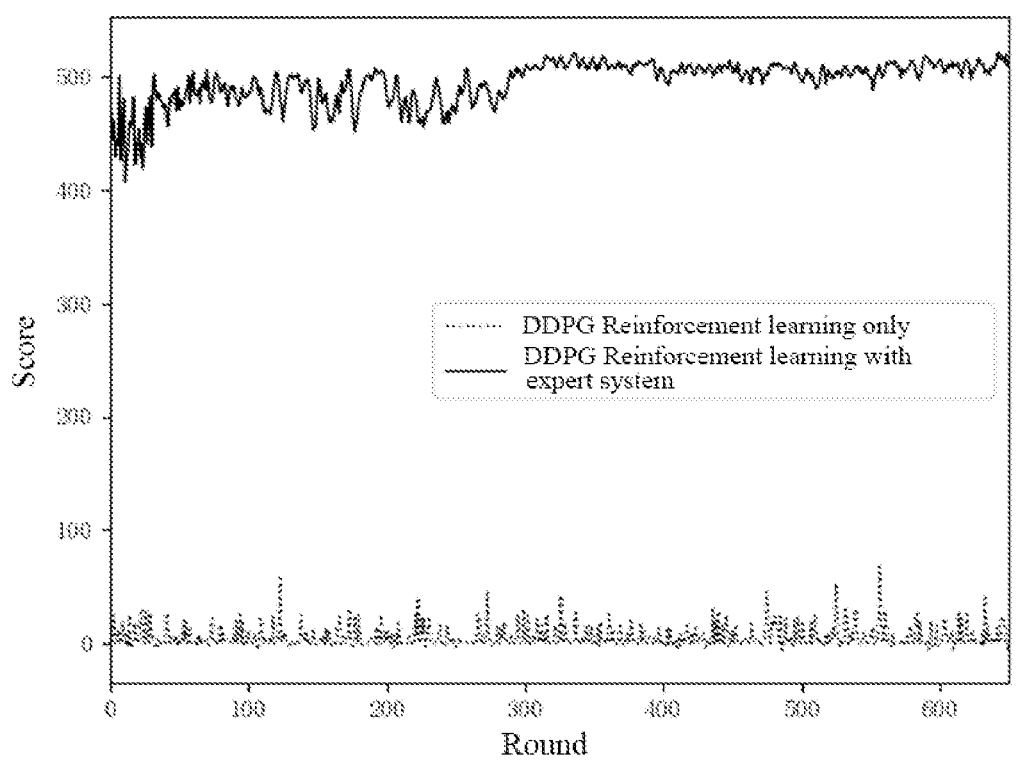
FIG. 2 is a schematic diagram illustrating a comparison of performance of a reinforcement learning model using only reinforcement learning and a reinforcement learning model using a method of the disclosure in one embodiment.

FIG. 2 shows the performance comparison of reinforcement learning models with and without expert systems for the test cases.

When the expert system is not introduced, the reinforcement learning model needs to directly learn the active power adjustment amount and terminal voltage adjustment amount for the 54 generator units, i.e., a 108-dimensional continuous action vector, which is extremely difficult to converge. As shown in FIG. 2, the model performance is not improved significantly after more than 600 training rounds. Moreover, when the reinforcement learning model randomly explores the power grid operation mode, the probability of finding an effective mode is low, as shown in FIG. 2, where the score of the model without the expert system never exceeds 100 points during the more than 600 training rounds and remains at a very low level.

When the expert system is introduced, the performance of the reinforcement learning model with the expert system is significantly improved. Such improvement comes from two aspects: first, the reinforcement learning model indirectly influences the operation mode of the power grid by guiding the expert system, where the specific operation mode is generated by the expert system with guaranteed quality, reaching a score of over 400 points at the beginning of training; second, the reinforcement learning model only needs to learn a 2-dimensional discrete action vector composed of two scalar coordinates, making convergence simpler, and the model converges after more than 300 training rounds.

(II) Operating Effect Under Normal Scenario

Figure 3:
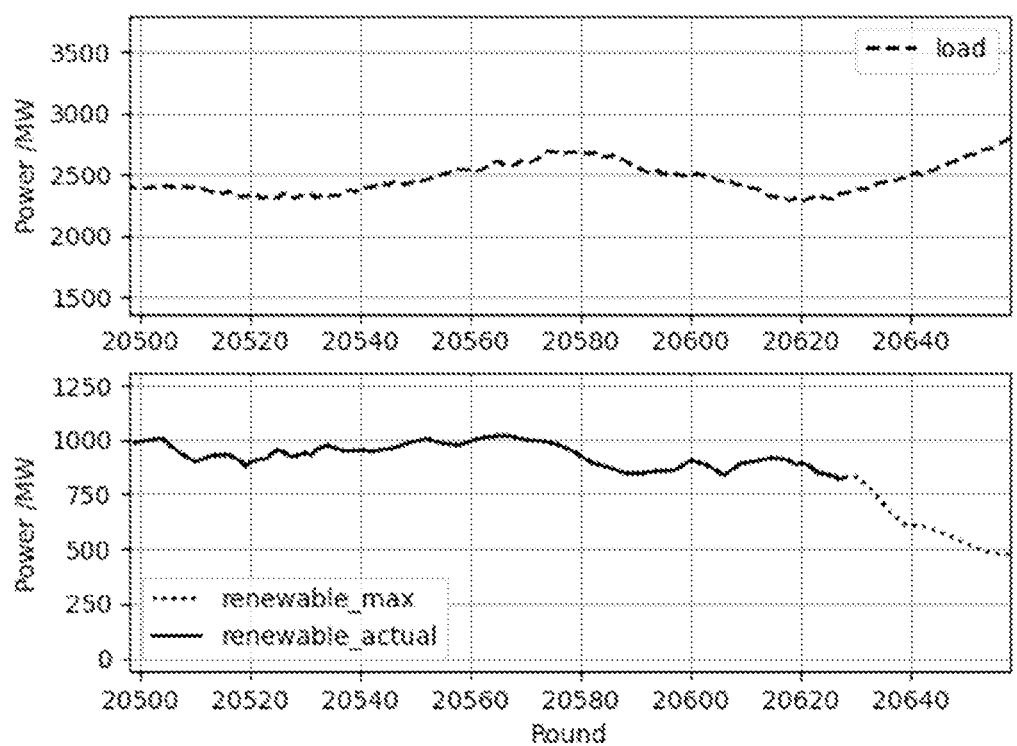
FIG. 3 is a schematic diagram illustrating an adjustment effect in a normal scenario in one embodiment.

FIG. 3 shows the operating effect of the automatic adjustment of the power grid operation mode under a normal scenario. In the normal scenario, load fluctuations and renewable energy power output fluctuations are relatively smooth. This adjustment method can fully absorb the power output of the renewable energy while ensuring the safe and stable operation of the power grid.

(III) Operating Effect Under Extreme Scenario

Figure 4:
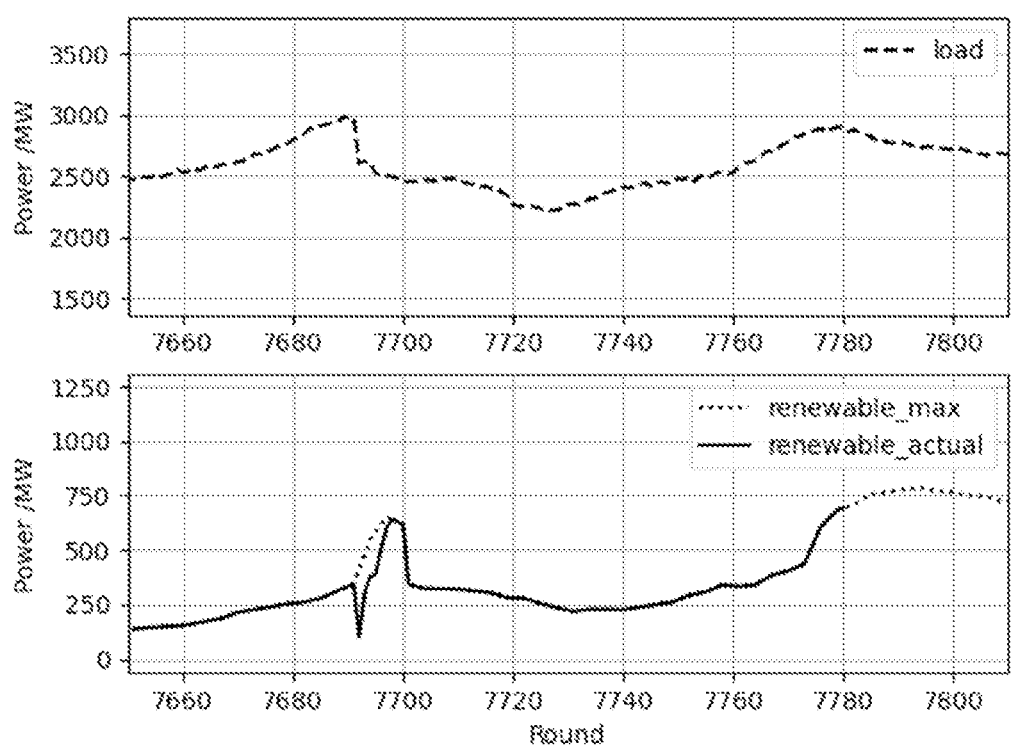
FIG. 4 is a schematic diagram illustrating an adjustment effect in an extreme scenario in one embodiment.

FIG. 4 shows the operating effect of the automatic adjustment of the power grid operation mode under an extreme scenario. In the extreme scenario, the load decreases rapidly while the power output of renewable energy generator units increases sharply. In this scenario, to ensure grid stability, the power output of the renewable energy generator units cannot be fully absorbed. The adjustment method promptly controls the situation by partially curtailing wind and solar generation at first and then moving towards full absorption, thereby achieving maximum absorption of renewable energy power output while ensuring the safe and stable operation of the power grid.

Through the description of the above embodiments, those skilled in the art can clearly understand that the disclosed method can be implemented with software and necessary general-purpose hardware, or through dedicated hardware including dedicated integrated circuits, dedicated CPUs, dedicated memory, and dedicated components. In general, any function completed by a computer program can easily be implemented with corresponding hardware, and the specific hardware structure used to implement the same function can vary, for example, the specific hardware structure can be implemented as analog circuits, digital circuits, or dedicated circuits. However, for this disclosure, software implementation is often a preferable embodiment.

Although the embodiments of the present disclosure have been described with reference to the accompanying drawings, the disclosure is not limited to these specific embodiments and application fields. The specific embodiments described above are merely illustrative, instructive, and not restrictive. Those skilled in the art, under the guidance of this specification and without departing from the scope of the disclosure protected by the claims, can make many other forms, all of which fall in the scope of the protection of the present disclosure.

What is claimed is:

1. A method for automatic adjustment of a power grid operation mode based on reinforcement learning, comprising:
   determining a total active power adjustment amount of thermal power units at a next time;
   allocating the total active power adjustment amount to the thermal power units according to an optimal control sequence when an action space of each thermal power unit is within a power output adjustment range;
   allocating the total active power adjustment amount to the thermal power units according to the optimal control sequence after a startup-shutdown operation, when the action space of each thermal power unit is below a lower limit or above an upper limit of the action space of the thermal power unit; and
   after the allocation is completed, redistributing a power flow adjustment amount based on a line overload or critical line overload, and adjusting a unit terminal voltage,
   wherein the optimal control sequence of the thermal power units is obtained through a reinforcement learning model;
   wherein redistributing the power flow adjustment amount comprises:
   identifying a key unit of a line load rate;
   when the key unit is a renewable energy unit, reducing a power output of the renewable energy unit to a first set value when the line load rate is greater than the first set threshold; reducing a power output of the renewable energy unit to a second set value when the line load rate is greater than 1 and less than or equal to the first set threshold, and the renewable energy unit is still overloaded as a number of continuous reductions reaches a set number; and
   when the key unit is a thermal power unit, reducing a power output of the thermal power unit to a lower limit of the power output of the thermal power unit.

2. The method according to claim 1, wherein the key unit is determined by an active powerline load rate sensitivity matrix, which comprises:
   extracting row vectors of the active power-line load rate sensitivity matrix;
   filtering components corresponding to nodes where units are located; and
   determining a unit mounted on a node corresponding to a component with a largest absolute value as the key unit,
   wherein the active power-line load rate sensitivity matrix is an m×n matrix, where m is a number of branches in a power system and n is a number of nodes in the power system.

3. The method according to claim 2, wherein the active power-line load rate sensitivity matrix is extracted based on historical operating data when all units are fully operational and no disconnected lines exist in a grid.

4. The method according to claim 1, wherein
   the optimal control sequence of the thermal power units is obtained by inputting a foundational control sequence of the thermal power units into the reinforcement learning model;
   the foundational control sequence of the thermal power units is obtained by summing and sorting column vectors of an active power-line load rate sensitivity matrix; and
   the active power-line load rate sensitivity matrix is an m×n matrix, where m is a number of power branches and n is a number of power nodes.

5. The method according to claim 4, wherein the active power-line load rate sensitivity matrix is extracted based on historical operating data when all units are fully operational and no disconnected lines exist in a grid.

6. The method according to claim 1,
   wherein the reinforcement learning model takes the unit control sequence of thermal power units as a state of an agent, uses two positions within the unit control sequence as actions of the agent, and employs a comprehensive evaluation index as a reward, wherein factors influencing the comprehensive evaluation index comprise relative absorption of renewable energy, line overload situations, unit power output constraints, node voltage constraints, and operational economic costs.

7. The method according to claim 6, wherein the reward is calculated using the following equation:

$$R = \sum_{i=1}^{5} r_i,$$

where, R is the reward; $r_i$ is a partial reward value;
when i=1, $$r_1 = \frac{\sum_{j=1}^{Re} \text{renewable}_{t+1,j}}{\sum_{j=1}^{Re} \text{renewable}_{t+1,j}^{max}},$$

where, $\text{renewable}_{t+1,j}$ is a power output of a j-th renewable energy unit at time t+1;
$\text{renewable}_{t+1,j}^{max}$ is an upper limit of the power output of the j-th renewable energy unit at time t+1;
Re is a number of renewable energy units;
when i≠1, $$r_i = \begin{cases} -0.5, & A^i_{max} < A^i \\ 0, & A^i_{min} \le A^i \le A^i_{max}, \\ -0.5, & A^i < A^i_{min} \end{cases}$$

where, A represents constraint; when i=2, the constraint is a line current; when i=3, the constraint is a unit power output; when i=4, the constraint is a node voltage; when i=5, the constraint is operational economic cost; a subscript max and a subscript min represent an upper limit of a corresponding constraint and a lower limit of the corresponding constraint, respectively.

8. The method according to claim 1, wherein the total active power adjustment amount of the thermal power units at the next time is determined by the following equation:

$$\Delta thermal = thermal_{t+1} - thermal_t,$$

where, $thermal_t$ is a thermal power output at a current time t, $thermal_{t+1}$ is a thermal power output at the next time; $thermal_{t+1}$ is calculated by the following equation:

$$thermal_{t+1} = \sum_{l=1}^{L} load_{t+1,l} + loss_{t+1} - balance_{t+1} - \sum_{j=1}^{Re} renewable_{t+1,j},$$

where, L is a total number of loads, l is a load number variable, Re is a number of the renewable energy units, j is a renewable energy unit number variable;

$$\sum_{l=1}^{L} load_{t+1,l}$$

is a total load at time t+1;
$renewable_{t+1, j}$ is a power output of a j-th renewable energy unit at time t+1;
$balance_{t+1}$ is a balance unit power output at time t+1;
$loss_{t+1}$ is network loss power at the next time, calculated by the following equation:

$$loss_{t+1} = loss_t \cdot Lfactor,$$

where Lfactor is a network loss estimation coefficient, calculated by the following equation:

$$L\,factor = \frac{\sum_{l=1}^{L} load_{t+1,l}}{\sum_{l=1}^{L} load_{t,l}}.$$

9. The method according to claim 1, wherein the startup-shutdown operation comprises:
when load fluctuations cause a required thermal power adjustment amount to exceed an upper limit of ramping constraints of the thermal power units, the thermal power units are started in an ascending sequence of line load rate sensitivity; power provided by the started thermal power units can compensate for a part of the required thermal power adjustment amount that exceeds the upper limit of the ramping constraints;
when the load fluctuations cause the required thermal power adjustment amount to be below a lower limit of the ramping constraints of the thermal power units, the thermal power units are shut down in a descending sequence of the line load rate sensitivity; power reduction from the shutdown thermal power units can offset the required thermal power adjustment amount being below the lower limit of the ramping constraints;
when a ratio of actual processing to maximum processing for all operating units exceeds a second set threshold, the thermal power units are started in an ascending sequence of the line load rate sensitivity to make the ratio less than the second set threshold;
when a ratio of actual processing to maximum processing for all operating units is below a third set threshold, the thermal power units are shut down in a descending sequence of the line load rate sensitivity to make the ratio greater than the third set threshold.

10. The method according to claim 1, wherein adjusting the unit terminal voltage comprises:
when $Q_k \geq 100$, $U_k = U_k - 0.01$;
when $60 \leq Q_k < 100$, $U_k = U_k - 0.004$;
when $-90 < Q_k < 60$, $U_k = U_k$;
when $-180 < Q_k \leq -90$, $U_k = U_k + 0.0015$;
when $Q_k \leq -180$, $U_k = U_k + 0.01$;
where a voltage of a generator unit is denoted as $U_k$, and a reactive power is denoted as $Q_k$, where k represents a generator unit identifier.

\* \* \* \* \*